Sept. 10, 1940.  H. G. VAUGHN  2,213,971
TOOL
Filed Oct. 13, 1936  3 Sheets-Sheet 1
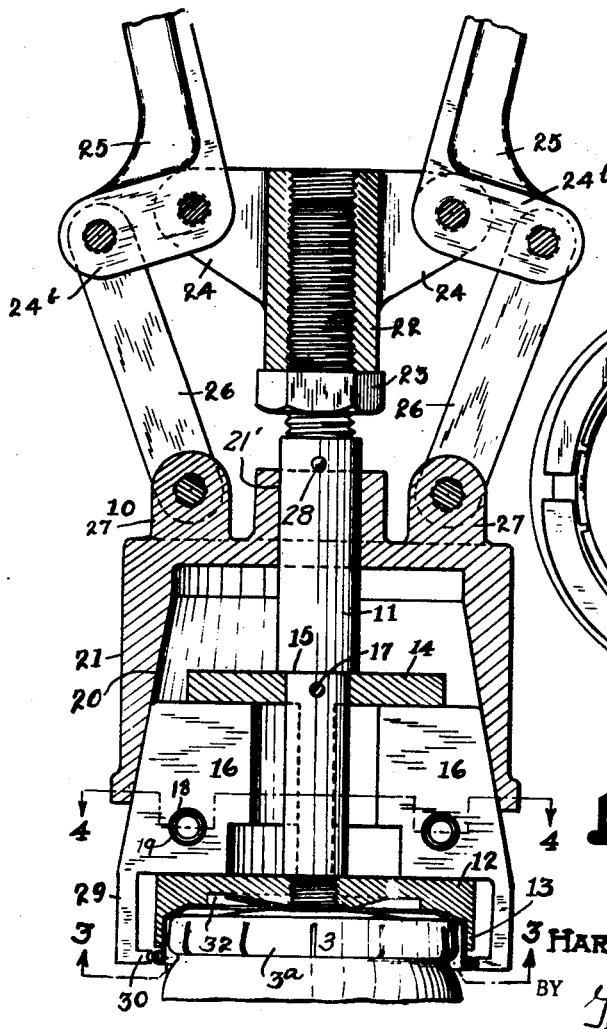
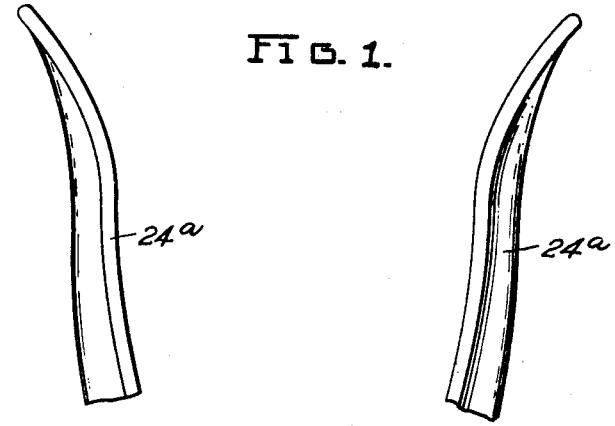
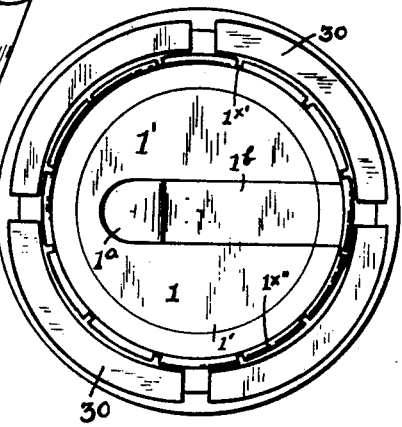
INVENTOR.
HAROLD GAR VAUGHN.
BY Geo. B. Pitts
ATTORNEY.

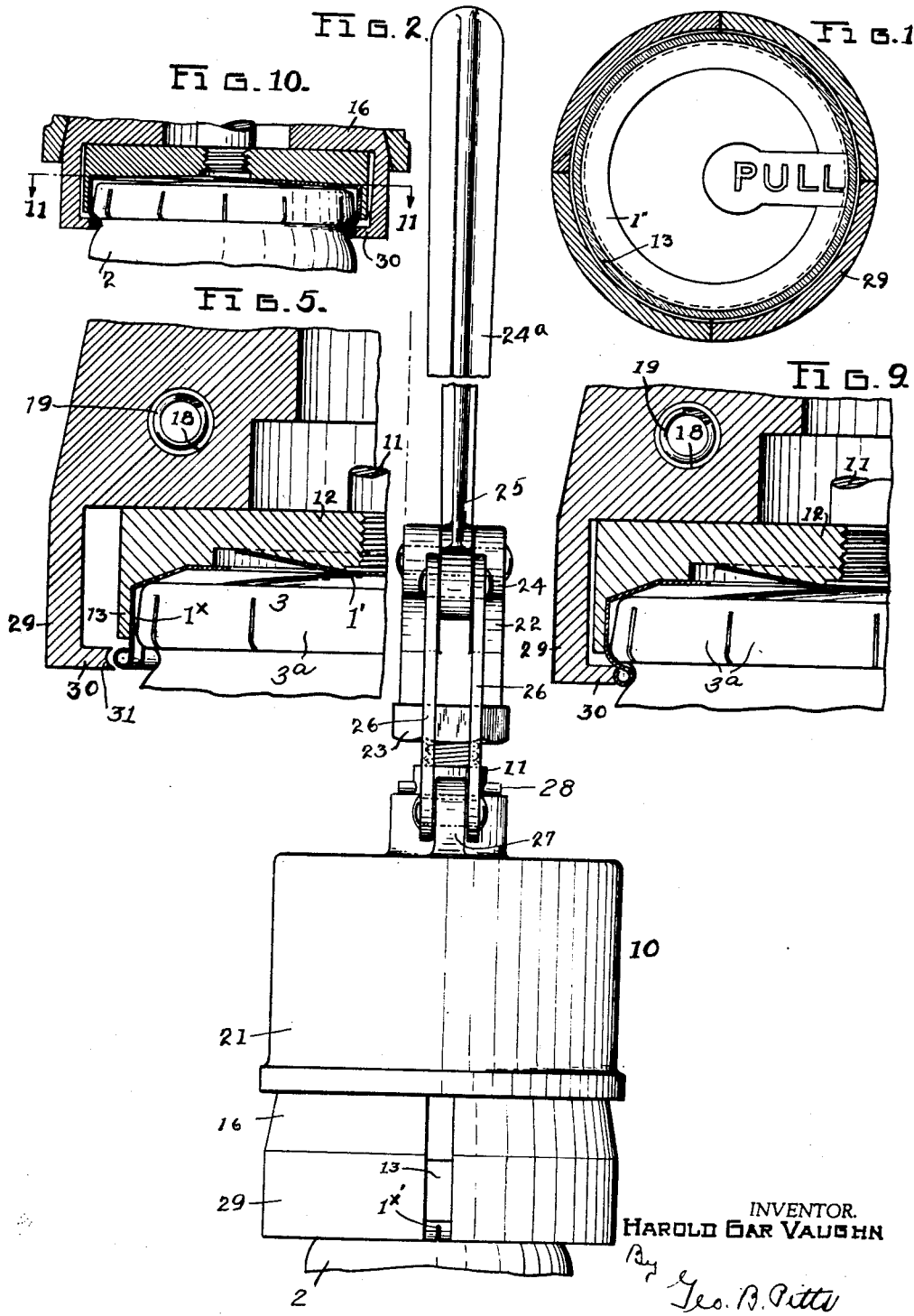

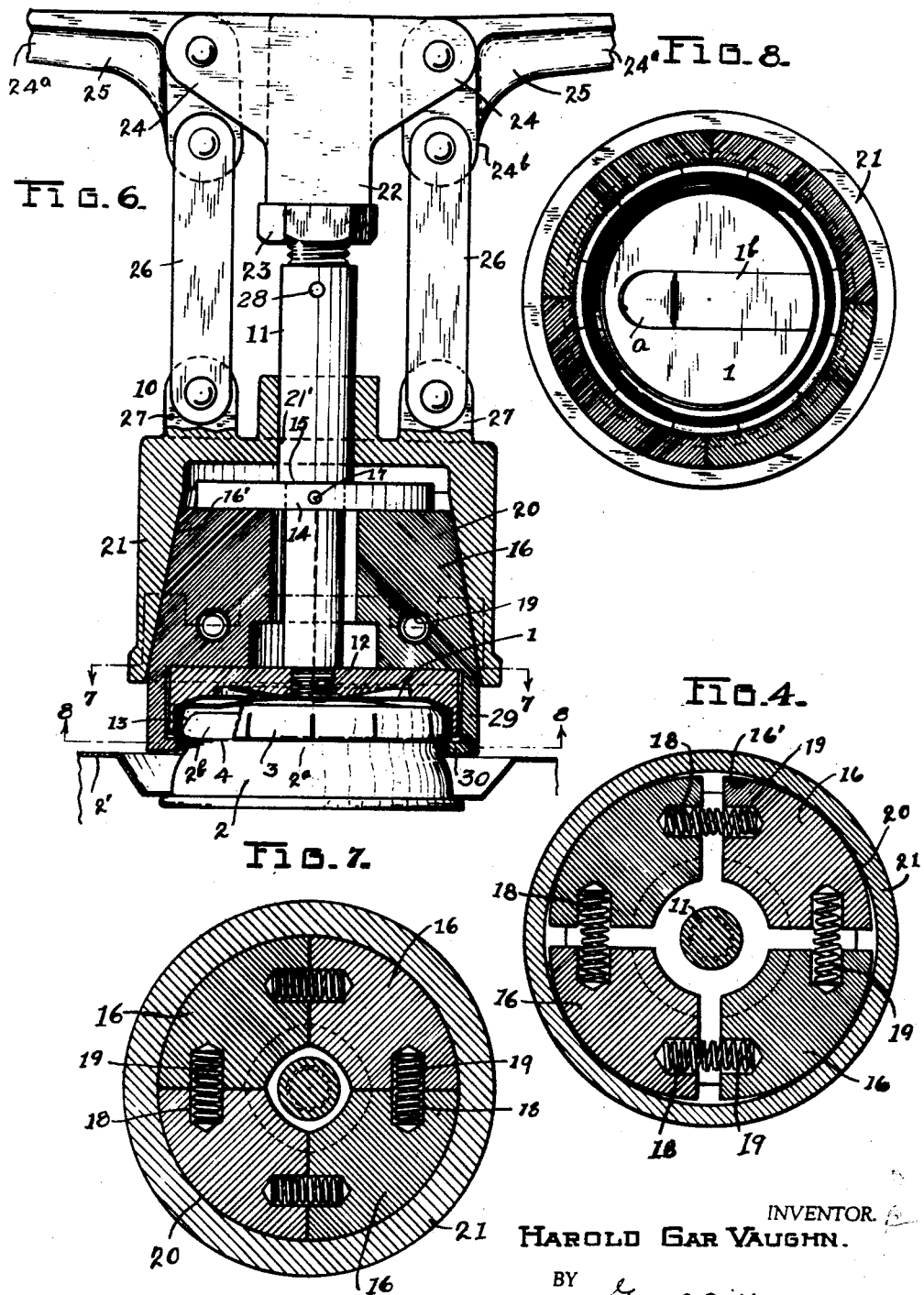

UNITED STATES PATENT OFFICE 2,213,971

TOOL

Harold Gar Vaughn, Warren, Ohio, assignor to
The Ohio Corrugating Company, Warren, Ohio,
a corporation of Ohio Application October 13, 1936, Serial No. 105,412

5 Claims. (Cl. 113—18)

This invention relates to a tool for applying a device upon the walls of a container in relation to the filling or emptying opening therefor. The device may close and seal the container opening or it may enclose a closure member for the container opening, thereby serving both as a sealing means to prevent tampering and a supplemental closure or it may surround a closure member for the container opening and seal the member against tampering.

One object of the invention is to provide a tool of this character that is relatively simple and readily positioned and operated.

Another object of the invention is to provide a tool of this character wherein provision is made to eliminate pressure on the side walls of the container opening or on the closure member, where the latter is employed, during operation of the tool.

Another object of the invention is to provide a crimping tool having a plurality of crimping jaws mounted to move in a plane at right angles to the axis of the container opening, thereby effecting a crimping of the skirt portion of the applied device and eliminating danger of distortion of other portions thereof.

Other objects of the invention will be apparent to those skilled in the art to which my invention relates from the following description taken in connection with the accompanying drawings, wherein Fig. 1 is a sectional view of a tool embodying my invention, the tool being shown associated with the walls forming the opening from a container and in position ready to crimp the skirt of a sealing device (the latter being shown in section).

Fig. 2 is a side elevation of the parts shown in Fig. 1.

Fig. 3 is a bottom plan view on the line 3—3 of Fig. 1.

Fig. 4 is a section on line 4—4 of Fig. 1.

Fig. 5 is a fragmentary section similar to Fig. 1, enlarged.

Fig. 6 is a fragmentary section similar to Fig. 1, but showing the crimping jaws in operated or closed position.

Figs. 7 and 8 are sections on the lines 7—7 and 8—8, respectively, of Fig. 6.

Fig. 9 is a fragmentary section similar to Fig. 6, enlarged.

Fig. 10 is a fragmentary section similar to Fig. 6, but showing the positioning of a different form of sealing device.

Fig. 11 is a section on the line 11—11 of Fig. 10.

Fig. 12 is a side elevation of one form of device adapted to be applied to a container opening (parts being broken away).

As illustrating the preferred application of a tool (indicated as an entirety at 10) embodying my invention, it is shown as positioning a device 1 in locked engagement with the walls 2 forming the opening into and from a container 2' in sealing relation to a closure member 3, thereby sealing both the container opening and the closure member 3, the sealing device being formed of thin metal to quickly and easily insure a permanent deformation thereof to detect unauthorized access to the container opening or tampering with its closure member, as well as to prevent replacement of the device if removed. The container 2' may be formed of sheet metal, the upper wall of which is provided with an up-standing collar forming the walls 2 of the container opening. The walls 2 have a restricted annular portion 2a and an annular expanded portion 2b to form a circumferential shoulder 4. The shoulder 4 forms a retaining wall for the side walls of the closure member 3 and the marginal portion of the skirt of the sealing device 1. The sealing device 1 may be (a) of the construction shown in Figs. 3 and 8, consisting of a top 1' and a skirt 1x having spaced slots 1x' around its marginal edge to form bendable locking tabs which have beaded edges 1x'', or (b) of the construction shown in Figs. 10 and 11 wherein the top consists of an inwardly extending annular flange 1'' engaging the top wall of the closure member 3.

The sealing devices and their assembly with a closure member form the subjects-matter of my co-pending application filed August 20, 1936, Serial No. 97,061, now Patent No. 2,121,048, for which reason no claim thereto is made herein.

The tool 10 consists of the following: 11 indicates a shank or post provided on its lower end with a combined seating or positioning and guide member 12 adapted to rest on the sealing device 1 during the positioning of the latter (see Fig. 1) and having a circumferential depending guard 13 which surrounds the skirt 1x of the sealing device above the slots 1x' for a purpose later set forth. By preference the member 12 is formed with a threaded opening and screwed onto the lower end of the shank 11 to rigidly secure the member thereto. Above the member 12 and spaced therefrom is a co-operating guide member 14 surrounding the shank and held in fixed relation to the member 12 against a shoulder 15 provided on the shank 11. The opposed walls or faces of the members 12, 14, are in parallel relation and guide and slidably support a set of crimping members each indicated as an entirety at 16, for relative movement at right angles to and radially of the axis of the shank 11. The guide member 14 is preferably rigidly secured to the shank 11 against the shoulder in any desired manner, the securing means being shown as a pin 17 which is driven through the member 14 and shank 11.

The opposite side walls of the crimping members 16 are formed with recesses 18, each alined with a recess in the opposed side wall of the adjacent crimping member. Each two alined recesses encloses an expansion spring 19 the ends of which engage the bottoms of the recesses to normally exert lateral pressure. As shown, the crimping members are segmental shaped (as will be understood from Fig. 7), and by preference each recess 18 extends at right angles to the adjacent side wall of the crimping member. As all the springs 19 are similarly arranged they cooperate to normally slide the crimping members 16 radially outwardly against and in engagement with the inner wall 20 of a control member 21, the wall 20 serving to limit the outward movement of the crimping members 16. The control member 21 is preferably cup-shaped and inverted and its inner side walls 20 are conical to form a cam which co-acts with the outer correspondingly shaped walls 16' of the crimping members 16. The top wall of the control member is formed with an opening 21' through which extends that portion of the shank 11 above the guide member 14, the shank thereby forming a support and guide on which the control member 21 slides upwardly and downwardly. The downward movement of the control member 21 serves, through the co-action of its walls 20 and the walls 16' of the crimping members 16, to move the latter radially inwardly to effect the positioning of the sealing device 1 in clamped engagement with the retaining wall or shoulder 4, as later set forth; whereas movement of the control member 21 upwardly permits the springs 19 to move the crimping members 16 radially outwardly whereby the tool may be positioned upon the device 1 for clamping or crimping the tabs thereof in locking engagement with the shoulder 4 and disengaged from the device and its removal after the device is secured in position. The upper end of the shank 11 is provided with screw threads to adjustably mount thereon a support 22, the latter being fixed in adjusted position by a jam nut 23. The upper end of the support 22 is provided with diametrically disposed projecting lugs 24, preferably two lugs at each side of the support between which is mounted a bell crank 25, having a long arm 24a to serve as a handle. The short arm 24b of each bell crank together with a link 26 pivoted thereto and a lug 27 on the top wall of the control member 21 (preferably two links disposed on opposite sides of the arm 24b and lug 27) form a toggle to operate the latter upwardly and downwardly, when the handles 24a are moved from the Fig. 1 position to the Fig. 6 position and back again. A pin 28 projecting from one or both sides of the shank 11 forms a stop to limit the upward movement of the control member 21. By adjustment of the support 22 on the shank 11, wear on the parts may be compensated for to insure a constant length of movement of the member 21, whereby the jaws, when in closed position, will constitute an annular wall having a predetermined diameter dependent upon the size of the sealing devices to be engaged.

Each crimping member 16 is provided on its lower outer side edge with an integral depending wall 29, which extends to a point below the circumferential edge of the guard 13 and carries on its lower end an inwardly extending crimping jaw 30, the face of which is formed with a groove 31 to form a seat for the beads 1x'' on the bendable tabs provided on the skirt 1x of the sealing device 1, the seats 31 thereby serving as a guide to the operator for alining the tool crimping jaws 30 in operative relation to the tabs whereby the latter may be simultaneously and uniformly crimped or contracted inwardly at substantially right angles to the skirt 1x.

In operation, the tool 10 is positioned as shown in Figs. 1 and 8, with the guide member 12 resting on the sealing device 1. Thereafter the handles 24a are simultaneously operated to the position shown in Fig. 6, the effect of which is to bend the tabs inwardly into engagement with the shoulder 4 and inturn ends of the closure member 3 (see also Fig. 9), thereby permanently clamping the device 1 in position and preventing access to and removal of the member 3. As will be noted, the guard 13 extends downwardly and surrounds that portion of the skirt 1x above the slots 1x' formed in the marginal edge portion thereof so that danger of causing inward pressure upon the skirt and through it imparting engagement with or pressure upon the side walls of the closure member 3 and distorting these side walls, is avoided. This arrangement is particularly advantageous where the closure member 3 is of a type intended to be removed and replaced from time to time. In the form of construction herein illustrated, and as shown in my aforesaid co-pending application, the side walls of the closure member 3 consist of spring fingers 3a which are adapted to be expanded and contracted by flexing the top of the member, as set forth in the said application; accordingly, any distortion of or undue pressure upon the fingers 3a would affect or impair their engagement or re-engagement with the wall 4 and hence make the closure member useless for re-use.

It will be noted that in my form of construction the guide members are fixedly disposed at right angles to and connected to the shank 11 and the lower guide member is arranged to rest on the top of the cap and accordingly the crimping members 16 move radially in a plane at right angles to the axis of the supporting shank 11 and when operated inwardly there is no pressure exerted on the skirt or bendable tabs of the sealing device or fingers 3a of the enclosure member in an upwardly inclined direction or pressure of the guide member 12 on the top 1' of the sealing device due to the operation of the crimping jaws 29. On the contrary, since the crimping members are guided by the walls of the guide members 12, 14, the jaws 29 move in a common plane.

The positioning and guide member 12 is formed in its lower face with an annular recess 32 to accommodate the bend-up end 1a for a scored section 1b forming part of the top 1' of the device 1.

To those skilled in the art to which my invention relates many changes in construction and widely differing embodiments and applications of the invention will be apparent without departing from the spirit and scope thereof. My disclosures herein are purely illustrative and not intended to be in any sense limiting.

What I claim is:

1. In a tool of the class described, the combination of a shank, a combined positioning and guide member fixed on the lower end of said shank adapted to rest on the top portion of a device to be applied to a container opening and provided with a depending circumferential guard, a guide member mounted on said shank in spaced relation to said first mentioned member, a plurality of relatively movable crimping members mounted between and slidably engaging said guide members for movement radially and provided on their lower ends with depending walls extending beyond the lower circumferential end of said guard, the outer ends of said depending walls being adapted to engage and crimp portions of the device into engagement with the walls of the container opening, and means for moving said crimping members inwardly radially.

2. In a tool of the class described, the combination of a shank, a combined positioning and guide member fixed on the lower end of said shank adapted to rest on the top portion of a device to be applied to a container opening and provided with a depending circumferential guard, a guide member mounted on said shank in spaced relation to said first mentioned member, a plurality of relatively movable crimping members mounted between and slidably engaging said guide members for movement radially and provided on their lower ends with depending walls extending beyond the lower circumferential end of said guard, the outer ends of said depending walls being provided with inturned crimping jaws adapted to engage and crimp portions of the device into engagement with the walls of the container opening, and means for moving said crimping members inwardly radially.

3. In a tool of the class described, the combination of a shank, a combined positioning and guide member fixed on the lower end of said shank adapted to rest on the top portion of a device to be applied to a container opening and provided with a depending circumferential guard, a guide member mounted on said shank in spaced relation to said first mentioned member, a plurality of relatively movable crimping members mounted between and slidably engaging said guide members for movement radially inwardly and outwardly and provided on their lower ends with depending walls extending beyond the lower circumferential end of said guard, the outer ends of said depending walls being provided with inturned crimping jaws adapted to engage and crimp portions of the device into engagement with the walls of the container opening, the active faces of said jaws being grooved to form seats for beads provided on the device, and means for moving said crimping members inwardly radially.

4. In a tool of the class described, the combination of a shank, a combined positioning and guide member fixed on the lower end of said shank adapted to rest on the top portion of a device to be applied to a container opening and provided with a depending circumferential guard arranged to surround the skirt of said device, a guide member mounted on said shank above and in spaced relation to said first mentioned member, a plurality of relatively movable members around said shank and mounted between and slidably engaging said guide members for movement radially and means for moving said movable members inwardly radially, said movable members being provided with walls depending beyond the lower circumferential end of said guard and having on their outer ends inturned crimping jaws adapted to move inwardly beyond said guard and crimp the marginal portion of the skirt into engagement with the walls of the container opening.

5. In a tool of the class described, the combination of a shank, a circular member fixed to the lower end of said shank and adapted to rest on the closure device to be applied to a container opening and provided with a depending circumferential guard, a plurality of relatively movable members slidably mounted on the upper side of said circular member and surrounding said shank and movable independently thereof and provided on their outer sides outwardly of said circular member with crimping jaws depending therefrom beyond the lower circumferential end of said guard for engagement with the side portion of the closure device, a device slidably mounted on said shank and operatively engaging said relatively movable members for moving them inwardly radially, and operating connections between said shank and said slidable device.

HAROLD GAR VAUGHN.